(12) United States Patent
Schwarte et al.

(10) Patent No.: US 8,287,638 B2
(45) Date of Patent: Oct. 16, 2012

(54) AQUEOUS EFFECT PIGMENT PASTE, METHOD FOR PRODUCING THE SAME AND THE USE THEREOF

(75) Inventors: Stephan Schwarte, Emsdetten (DE); Norbert Löw, Nürnberg (DE); Peter Sonntag, Everswinkel (DE)

(73) Assignee: BASF Coatings GmbH, Munster (DE)

( * ) Notice: Subject to any disclaimer, the term of this patent is extended or adjusted under 35 U.S.C. 154(b) by 957 days.

(21) Appl. No.: 11/574,814

(22) PCT Filed: Sep. 29, 2005

(86) PCT No.: PCT/EP2005/055026
§ 371 (c)(1),
(2), (4) Date: Mar. 7, 2007

(87) PCT Pub. No.: WO2006/040284
PCT Pub. Date: Apr. 20, 2006

(65) Prior Publication Data
US 2007/0269606 A1 Nov. 22, 2007

(30) Foreign Application Priority Data
Oct. 8, 2004 (DE) .......................... 10 2004 049 095

(51) Int. Cl.
*C08K 5/00* (2006.01)
(52) U.S. Cl. ...................... 106/499; 106/493; 427/385.5; 427/407.1
(58) Field of Classification Search ............... 427/385.5, 427/407.1; 106/493, 499
See application file for complete search history.

(56) References Cited

U.S. PATENT DOCUMENTS

| | | | |
|---|---|---|---|
| 4,434,010 A | 2/1984 | Ash | |
| 4,704,356 A | 11/1987 | Thonar | |
| 4,779,898 A | 10/1988 | Berning et al. | |
| 4,828,826 A | 5/1989 | Franz et al. | |
| 4,838,648 A | 6/1989 | Phillips et al. | |
| 4,930,866 A | 6/1990 | Berning et al. | |
| 5,059,245 A | 10/1991 | Phillips et al. | |
| 5,135,812 A | 8/1992 | Phillips et al. | |
| 5,171,363 A | 12/1992 | Phillips et al. | |
| 5,214,530 A | 5/1993 | Coombs et al. | |
| 5,244,649 A | 9/1993 | Ostertag et al. | |
| 6,632,915 B1 * | 10/2003 | Schwarte et al. | 528/75 |
| 2003/0220446 A1 * | 11/2003 | Faler et al. | 524/590 |
| 2005/0182179 A1 * | 8/2005 | Sapper et al. | 524/449 |

FOREIGN PATENT DOCUMENTS

| | | |
|---|---|---|
| DE | 3636183 A1 | 3/1988 |
| DE | 3636156 A1 | 4/1988 |
| DE | 3718446 A1 | 12/1988 |
| DE | 3719804 A1 | 3/1989 |
| DE | 3930601 A1 | 3/1991 |
| DE | 4437535 A1 | 4/1996 |
| DE | 4009858 C2 | 2/1998 |
| DE | 19948004 A1 | 7/2001 |
| DE | 10043405 C1 | 6/2002 |
| DE | 10129899 A1 | 1/2003 |
| DE | 10240972 A1 | 3/2004 |
| EP | 0293746 B1 | 11/1990 |
| EP | 0283852 B1 | 5/1991 |
| EP | 0417567 B1 | 5/1993 |
| EP | 0608021 A1 | 7/1994 |
| EP | 0608021 B1 | 7/1994 |
| JP | 5311098 A | 11/1993 |
| WO | 03097752 A1 | 11/2003 |
| WO | WO03/097752 * | 11/2003 |

OTHER PUBLICATIONS

International Preliminary Report on Patentability for International Application No. PCT/EP2005/055026 dated Apr. 24, 2007.

* cited by examiner

*Primary Examiner* — Robert S Walters, Jr.
(74) *Attorney, Agent, or Firm* — Cantor Colburn LLP

(57) ABSTRACT

An aqueous effect pigment paste comprising
(A) at least one effect pigment,
(B) at least one graft copolymer in dispersion in an aqueous medium and preparable by subjecting at least one monomer (a) in an aqueous dispersion of at least one polyurethane (B1) containing at least one lateral and/or at least one terminal ethenylarylene group and preparable by reacting
  (1) at least one polyurethane prepolymer (B11) containing at least one free isocyanate group with
  (2) at least one adduct (B12), obtainable by reacting
    (2.1) at least one ethenylarylene monoiso-cyanate (B121) and
    (2.2) at least one compound (B122), selected from the group consisting of polyols, polyamines and compounds containing at least one hydroxyl group and at least one amino group,
  with one another so as to leave at least one isocyanate-reactive group in the adduct (B12),
to free-radical (co)polymerization; and
(C) at least one surface-active compound selected from the group consisting of polyoxyalkylene derivatives of non-drying oils;
process for preparing it, and its use.

31 Claims, No Drawings

AQUEOUS EFFECT PIGMENT PASTE, METHOD FOR PRODUCING THE SAME AND THE USE THEREOF

This application is a National Phase Application of Patent Application PCT/EP2005/055026 filed on 29 Sep. 2005, which claims priority to DE DE102004049095.3, filed 8 Oct. 2004.

The present invention relates to a new aqueous effect pigment paste. The present invention also relates to a new process for preparing an aqueous effect pigment paste. The present, invention relates not least to the use of the new aqueous effect pigment paste and of the aqueous effect pigment paste prepared by the new process.

It is known that pigment pastes or pigment preparations contain pigments in a higher concentration than that corresponding to the subsequent, application (cf. Römpp Lacke und Druckfarben, Georg Thieme Verlag, Stuttgart, N.Y., 1998, "Pigment preparations", page 452).

Aqueous effect pigment pastes which are used for preparing pigmented aqueous coating materials, especially aqueous basecoat materials, for producing color and/or effect coatings, especially basecoats, are known.

For instance, German patent application DE 100 27 291 A1 discloses an aqueous effect pigment paste comprising an aluminum-effect pigment, whose surface has been rendered hydrophilic using octylphenyl ethoxylate, and a polyurethane thickener.

German patent application DE 102 40 972 A1 discloses an aqueous metal effect pigment paste comprising at least one metal effect pigment, at least one nonassociative thickener comprising at least one methacrylate copolymer based on $(C_1-C_6)$-alkyl (meth)acrylate and (meth)acrylic acid, at, least one organic amine, at least one nonionic surfactant, such as Hydropalat® 3037 from Cognis, and water.

The known aqueous effect pigment pastes are easy to prepare and produce high standing stability and stirring stability, very good application behavior, and very good leveling in the pigmented coating materials prepared using them. The effect coatings produced from these materials have an isotropic pigment distribution and are free from defects such as light/dark shading (clouds) and specks.

The continually growing technical and esthetic demands of the market, particularly on the part, of the automakers and their customers, however, necessitate continual ongoing development of the existing pigmented coating materials and of the effect coatings produced from them.

German patent application DE 103 50 719.1, unpublished at the priority date of the present specification, describes an aqueous effect, pigment, paste comprising (A) from 10% to 65% by weight of at least one effect pigment,
(B) from 1% to 20% by weight of at, least one aqueous monomodal primary dispersion which is pseudo plastic after neutralization and has a solids content of from 15% to 40% by weight, comprising, as disperse phase, particles with an average size of from 10 to 500 nm which are composed of a hydrophobic core and a hydrophilic shell, said particles being constructed of at least one (meth)acrylate copolymer having a glass transition temperature of from 30 to 100° C. and an acid number of from 10 to 50 mg KOH/g,
(C) from 0.01% to 2% by weight of at least one organic amine and/or ammonia,
(D) from 0.1% to 3.0% by weight of at least one non-ionic surfactant, such as Hydropalat® 3037, and
(E) at least 10% by weight of an organic solvent, the percentages by weight being based in each case on the total amount of a pigment paste.

It is an object of the present invention to provide a new aqueous effect pigment paste which is particularly easy to prepare, stable on storage, and transportable. The new aqueous effect pigment paste ought to provide particularly storage-stable, pigmented aqueous coating materials which are particularly stable under shearing conditions and which even after long shearing, particularly in circuit lines of painting installations, exhibit no settling of effect pigments. The pigmented aqueous coating materials, especially the aqueous basecoat materials, ought to exhibit very good application behavior and very good leveling. As a result of the isotropic distribution of pigment, the resultant effect coatings, especially basecoats, ought to have an outstanding overall visual appearance and ought to be free from film defects, such as light/dark shading (clouds) and specks.

The invention accordingly provides the new aqueous effect pigment paste comprising (A) at least one effect pigment,
(B) at least one graft copolymer in dispersion in an aqueous medium and preparable by subjecting at least one monomer (a) in an aqueous dispersion of at least one polyurethane (B1) containing at least one lateral and/or at least one terminal ethenylarylene group and preparable by reacting
  (1) at least one polyurethane prepolymer (B11) containing at least one free isocyanate group with
  (2) at least one adduct (B12), obtainable by reacting
    (2.1) at least one ethenylarylene monoiso-cyanate (B121) and
    (2.2) at least one compound (B122), selected from the group consisting of polyols, polyamines and compounds containing at least one hydroxyl group and at least one amino group,
  with one another so as to leave at least one isocyanate-reactive group in the adduct (B12),
  to free-radical (co)polymerization; and
(C) at least one surface-active compound selected from the group consisting of polyoxyalkylene derivatives of non-drying oils.

The new aqueous effect pigment paste is referred to below as "effect pigment paste of the invention".

The invention further provides the new process for preparing an aqueous effect pigment paste, which involves mixing at least constituents (A), (B) and (C) with one another and homogenizing the resulting mixture, and which is referred to below as "process of the invention".

The invention provides not least for new uses of the effect pigment pastes of the invention and of the effect pigment pastes prepared by the process of the invention.

In the light of the prior art it was surprising and unforeseeable for the skilled worker that the object on which the present invention was based could be achieved by means of the effect pigment paste of the invention, the process of the invention, and the uses of the invention.

In particular it was surprising that the effect pigment pastes of the invention were particularly easy to prepare, stable on storage and transportable. The effect pigment pastes of the invention gave particularly storage-stable, pigmented aqueous coating materials which were particularly stable under shearing conditions and which even after long shearing, especially in circuit lines of painting installations, exhibited no settling of effect pigments. The pigmented aqueous coating materials, especially the aqueous basecoat materials, exhibited very good application behavior and very good leveling. As a result of the isotropic distribution of pigment, the resultant effect coatings, especially basecoats, had an outstanding overall visual appearance and were free from film defects, such as light/dark shading (clouds) and specks.

The effect pigment pastes of the invention comprise at least one effect pigment (A).

The effect pigments (A) are preferably selected from the group consisting of organic and inorganic, optical effect, color and optical effect, magnetically shielding, electrically conductive, anticorrosion, fluorescent, and phosphorescent pigments. More preferably they are selected from the group consisting of organic and inorganic, optical effect, and color and optical effect pigments. In particular the organic and inorganic, optical effect, and color and optical effect pigments (A) are selected from the group consisting of metal effect pigments, effect pigments composed of metals and nonmetals, and nonmetallic effect pigments.

In particular the metal effect pigments (A) are aluminum effect pigments, iron effect pigments or copper effect pigments, such as commercial aluminum bronzes, aluminum bronzes chromated in accordance with DE 36 36 183 A1, commercial stainless steel bronzes, and commercial copper bronzes.

In particular the effect pigments (A) composed of metals and nonmetals are platelet-shaped aluminum pigments coated with iron oxide, as described for example in European patent application EP 0 562 329 A2; glass flakes coated with metals, especially aluminum; or interference pigments which comprise a reflector layer of metal, especially aluminum, and exhibit a strong color flop, as described for example in American patents U.S. Pat. No. 4,434,010 A1, U.S. Pat. No. 4,704,356 A1, U.S. Pat. No. 4,779,898 A1, U.S. Pat. No. 4,838,648 A1, U.S. Pat. No. 4,930,866 A1, U.S. Pat. No. 5,059,245 A1, U.S. Pat. No. 5,135,812 A1, U.S. Pat. No. 5,171,363 A1 or U.S. Pat. No. 5,214,530 A1.

The nonmetallic effect pigments (A) are in particular pearlescent pigments, especially mica pigments, as described for example in Merck Kontakte, 1992, No. 2, pages 3 to 60; platelet-shaped graphite pigments coated with metal oxides, as described for example in Japanese patent application JP 5-311098 A; interference pigments which contain no metal reflector layer but exhibit a strong color flop, as described for example in American patents U.S. Pat. No. 4,434,010 A1, U.S. Pat. No. 4,704,356 A1, U.S. Pat. No. 4,779,898 A1, U.S. Pat. No. 4,838,648 A1, U.S. Pat. No. 4,930,866 A1, U.S. Pat. No. 5,059,245 A1, U.S. Pat. No. 5,135,812 A1, U.S. Pat. No. 5,171,363 A1 or U.S. Pat. No. 5,214,530 A1, platelet-shaped effect pigments based on iron oxide with a shade ranging from pink to brownish red, as described for example in patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A or U.S. Pat. No. 5,244,649 A; or organic, liquid-crystalline effect pigments.

For further details refer to Römpp Lexikon Lacke und Druckfarben, Georg Thieme Verlag, 1998, page 176, "effect pigments" and pages 380 and 381, "metal oxide-mica pigments" to "metal pigments".

Examples of fluorescent and phosphorescent pigments (daylight-fluorescent pigments) are bis(azomethine) pigments.

Examples of suitable electrically conductive pigments are titanium dioxide/tin oxide pigments and pulverulent metal pigments.

Examples of magnetically shielding pigments are pigments based on iron oxides or chromium dioxide.

Examples of suitable anticorrosion pigments are zinc powders, lead silicates, zinc phosphates or zinc borates.

Consequently, on the basis of the multiplicity of suitable effect pigments (A), the effect pigment pastes of the invention ensure a universal scope for application and allow the preparation of pigmented aqueous coating materials which can be used to produce an extremely wide diversity of effect coatings having any of a very wide variety of physical effects.

The amount of the effect pigments (A) in the effect pigment pastes of the invention may accordingly vary very widely in accordance with the intended use of the pigmented aqueous coating materials in question and in accordance with the nature of the effect pigments (A). Preferably the amount, based on the effect pigment paste of the invention, is from 0.1% to 80%, more preferably from 1.0% to 70%, very preferably from 2.0% to 60%, with very particular preference from 3.0% to 50%, and in particular from 4.0% to 40% by weight.

The effect pigment pastes of the invention may further comprise at least one pigment other than the effect pigments (A), selected from the group consisting of organic and inorganic, color and extender pigments, pigments having at, least two of these properties, and nanoparticles, provided such an additional pigment does not adversely affect the performance properties of the effect pigment pastes of the invention.

Examples of suitable inorganic color pigments are white pigments such as zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details refer to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azo pigments", and page 379, "metal complex pigments".

Examples of suitable extender pigments or fillers are chalk, calcium sulfate, barium sulfate, silicates such as talc or kaolin, silicas, oxides such as aluminum hydroxide or magnesium hydroxide or organic fillers such as textile fibers, cellulose fibers, polyethylene fibers or polymer powders; for further details refer to Römpp Lexikon Lacke und Druckfarben, Georg Thieme Verlag, 1998, pages 250 ff., "fillers".

The nanoparticles are preferably selected from the group consisting of main group and transition group metals and their compounds. Preference is given to the main group and transition group metals selected from metals of main groups three to five, transition groups three to six, and transition groups one and two of the Periodic Table of the Elements, and from the lanthanides. Particular preference is given to using boron, aluminum, gallium, silicon, germanium, tin, arsenic, antimony, silver, zinc, titanium, zirconium, hafnium, vanadium, niobium, tantalum, molybdenum, tungsten, and cerium, especially aluminum, silicon, silver, cerium, titanium, and zirconium. The compounds of the metals are preferably the oxides, oxide hydrates, sulfates or phosphates. Preference is given to using silver, silicon dioxide, aluminum oxide, aluminum oxide hydrate, titanium dioxide, zirconium oxide, cerium oxide, and mixtures thereof, with particular preference silver, cerium oxide, silicon dioxide, aluminum oxide hydrate, and mixtures thereof, very preferably aluminum oxide hydrate and especially boehmite. The nanoparticles preferably have a primary particle size <50 nm, more preferably from 5 to 50 nm, in particular from 10 to 30 nm.

The effect pigment paste of the invention comprises at least one, especially one, graft copolymer (B) in dispersion in an aqueous medium.

The graft copolymer (B) is preparable by subjecting at least one monomer (a) in an aqueous dispersion of at least one polyurethane (B1) containing at least one lateral and/or at least one terminal ethenylarylene group to free-radical (co) polymerization.

The polyurethane (B1) is preparable by reacting
(1) at least one polyurethane prepolymer (B11) containing at least one free isocyanate group with
(2) at least one adduct (B12), obtainable by reacting
(2.1) at least one ethenylarylene monoisocyanate (B121) and
(2.2) at, least one compound (B122), selected from the group consisting of polyols, polyamines, and compounds containing at least one hydroxyl group and at least one amino group,
with one another so as to leave at least one isocyanate-reactive group in the adduct (B12).

The graft copolymers (B) and their dispersions in an aqueous medium, especially their primary dispersions, are known per se and are described in detail in German patent application DE 199 48 004 A1, page 3, line 26 to page 13, line 66, and page 20, Example 2, "The preparation of the primary dispersion of an inventive graft copolymer 1".

The monomers (a) used with preference are described in the German patent application on page 11, line 30 to page 13, line 39.

The ethenylarylene monoisocyanate (B121) preferably has the general formula I:

$$CH_2=C(R)\text{-}A\text{-}X\text{—}NCO \qquad (I)$$

in which the variables have the following definition:
A=substituted or unsubstituted $C_6$-$C_{20}$ arylene radical;
R=hydrogen atom, a halogen atom, a nitrile group, or a substituted or unsubstituted alkyl, cycloalkyl, alkylcycloalkyl, cyclo-alkylalkyl, aryl, alkylaryl, cycloalkylaryl, arylalkyl or arylcycloalkyl radical; and
X=divalent organic radical.

The arylene radical A of the formula (I) is preferably 1,2-, 1,3- and/or 1,4-phenylene, especially 1,3-phenylene.

The variable R of the formula (I) is preferably a hydrogen atom or a methyl group, especially a methyl group.

The divalent organic radical X of the formula (I) preferably designates a branched or unbranched $C_3$-$C_6$ alkanediyl radical.

The divalent organic radical X is, in particular, —$C(CH_3)_2$—.

The ethenylarylene monoisocyanate (B121) of formula (I) or at least one of the ethenylarylene monoisocyanates (B121) of formula (I) is more preferably 1-(1-isocyanato-1-methylethyl)-3-(1-methylethenyl)benzene.

The polyurethane (B1) preferably contains hydrophilic functional groups, especially carboxylic acid groups and/or carboxylate groups.

The polyurethane (B1) further preferably contains an ethenylarylene group of the general formula II:

$$CH_2=C(R)\text{-}A\text{-} \qquad (II)$$

in which the variable A is a substituted or unsubstituted $C_6$-$C_{20}$ arylene radical and the variable R is a hydrogen atom, a halogen atom, a nitrile group or a substituted or unsubstituted alkyl, cycloalkyl, alkylcycloalkyl, cycloalkylalkyl, aryl, alkylaryl, cycloalkylaryl, arylalkyl or arylcycloalkyl radical.

The radical R of the formula (II) is more preferably a hydrogen atom or a methyl group, especially a methyl group.

The arylene radical A of the formula (II) is more preferably 1,2-, 1,3- and/or 1,4-phenylene, especially 1,3-phenylene.

The ethenylarylene group (II) is preferably joined to the polyurethane main chain (B1) via a divalent or trivalent linking radical III containing at least one urethane group and/or urea group.

The linking radical III preferably contains at least one of the divalent or trivalent groups of the general formulae IIIa to IIIc:

$$\text{—X—NH—C(O)—O—} \qquad (IIIa)$$

$$\text{—X—NH—C(O)—NH—} \qquad (IIIb) \text{ or}$$

$$\text{—X—NH—C(O)—N<} \qquad (IIIc),$$

in which X designates one of the divalent organic radicals described above.

The polyurethane prepolymer (B11) is preferably preparable by reacting at least one compound (B122), selected from the group consisting of polyols, polyamines, and compounds containing at least one hydroxyl group and at least one amino group, with at least one polyisocyanate (B123).

The compounds (B122) are preferably oligomers or polymers.

In particular the oligomers and polymers (B122) are polyesters and/or polyurethanes.

The amount of the graft copolymers (B) in the effect pigment paste of the invention may likewise vary very widely and is guided in particular by the effect pigments (A) employed in each case. Preferably the amount, based on the effect pigment pastes of the invention, is from 1% to 50%, more preferably from 1.5% to 45%, very preferably from 2% to 40%, with very particular preference from 2.5% to 35%, and in particular from 3% to 30% by weight.

Accordingly the pigment-binder ratio (A):(B) may also vary very widely. The preferred ratios result from the amounts of (A) and (B) used with preference.

The effect pigment pastes of the invention further comprise at least one, especially one, surface-active compound selected from the group consisting of polyoxy-alkylene derivatives of nondrying oils.

The surface-active compounds (C) preferably each contain a polyoxyalkylene group.

Preferably the polyoxyethylene groups of the surface-active compounds (C) each contain from 10 to 60 oxyalkylene groups.

With particular preference the polyoxyethylene groups of the surface-active compounds (C) comprise or are composed of oxyethylene groups.

The surface-active compounds (C) are preferably derivatives of nondrying vegetable oils.

In particular the surface-active compounds (C) are derivatives of castor oil.

The surface-active compounds (C) are standard commercial compounds and are sold for example under the brand name Hydropalat® 3037 by the company Cognis.

The amount of the surface-active compounds in the effect pigment pastes of the invention may likewise vary very widely and is guided in particular by the dispersibility of the effect pigments (A). Preferably the amount, based on the effect pigment paste, is from 0.1% to 15%, more preferably from 0.2% to 10%, very preferably from 0.3% to 8%, with very particular preference from 0.4% to 6%, and in particular from 0.5% to 4% by weight.

The water content of the effect pigment, pastes of the invention may likewise vary very widely. Preferably it is, based on the pigment paste of the invention, from 10% to 90%, more preferably from 15% to 80% and in particular from 20% to 75% by weight.

The effect pigment pastes of the invention may further comprise further, conventional additives, such as are known, for example, from German patent application DE 199 48 004 A1, page 16 line 24 to page 17 line 5, and/or organic solvents, especially water-miscible organic solvents. This excludes those additives and solvents which together with the essential constituents of the effect pigment pastes of the invention enter into adverse interactions which produce, for example, decomposition reactions, phase separations or flocculations. The skilled worker is therefore able to make the correct selection on the basis of his or her general art knowledge, with the assistance where appropriate of a few guideline tests.

The method by which the effect pigment pastes of the invention are prepared has no peculiarities; instead, their preparation takes place by mixing at least the above-described essential constituents (A), (B) and (C) with one another and homogenizing the resulting mixture. This can be done using the mixing equipment which is conventional in paint technology, such as stirred tanks, dissolvers, kneading apparatus or agitator mills.

The effect pigment pastes of the invention prove to be particularly easy to prepare. They are stable on storage for very long periods, even with fluctuating temperatures, and are highly transportable. In particular, even after a prolonged period of storage, there is no gas evolution in the case of effect pigment pastes of the invention that include metal effect pigments, especially aluminum effect pigments. They are therefore highly suitable for a very wide variety of end uses. Preferably they are used for preparing sealants, adhesives and coating materials for sealing, adhesively bonding and coating substrates. More preferably they are used for preparing pigmented aqueous coating materials, especially aqueous basecoat materials.

Besides the effect pigment pastes of the invention it is possible to use the customarily used constituents to prepare the aqueous basecoat materials, examples being those constituents described in German patent application DE 199 48 004 A1, page 3, line 14 to page 17, line 8.

The aqueous basecoat materials preferably serve for producing multicoat color and/or effect paint systems on primed or unprimed substrates, particularly by a wet-on-wet method, comprising at least the following steps:
  (VI) preparing a basecoat film by applying an aqueous basecoat material to the substrate,
  (VII) drying the basecoat film,
  (VIII) producing a clearcoat film by applying a clearcoat material to the basecoat film, and
  (VIV) jointly curing at least the basecoat film and the clearcoat film;

as is described in detail, for example, in German patent application DE 199 48 004 A1, page 17, line 37 to page 19, line 22.

The substrates in question may be moldings, films and fibers, especially of plastic, films and fibers, motor vehicle bodies, industrial components, including mechanical, optical and electrical components, coils and packaging, or furniture, as described for example in German patent application DE 199 48 004 A1, page 17, lines 14 to 36.

The resultant multicoat effect coating systems exhibit an outstanding profile of properties which is outstandingly well-balanced in terms of mechanical properties, optical properties, corrosion resistance, intercoat adhesion and substrate adhesion. Particularly deserving of emphasis is the outstanding appearance, which is attributable to the defect-free basecoat.

EXAMPLES

Preparation Example 1

The Preparation of a Mixing Varnish 1

40.3 parts by weight of the primary dispersion of a graft copolymer (B) according to German patent, application DE 199 48 004 A1, Example 2, "The preparation of the primary dispersion of an inventive graft copolymer 1", page 20, lines 10 to 21, 36.2 parts by weight, of deionized water, 6.0 parts by weight of Surfynol® 100 (commercial surface-active compound from Air Products, 50 percent strength dilution in butyl glycol), 2.5 parts by weight of a polyoxyalkylene derivative of castor oil (Hydropalat® 3037 from Cognis) and 15 parts by weight of 1-propoxy-2-propanol were mixed with one another, and then the resulting mixture was homogenized.

Examples 1 (Inventive) and C1 and C2
(Comparative)

The Preparation of Effect Pigment Pastes 1
(Example 1) and C1 and C2 (Examples C1 and C2)

The effect pigment pastes 1 of Example 1 and C1 and C2 of Examples C1 and C2 were prepared by mixing the constituents indicated in the table, in the order stated, and homogenizing the resulting mixtures. The results pertaining to the stability of the resulting effect pigment pastes on storage are likewise given in the table. They underline the marked superiority of effect pigment paste 1 over effect pigment pastes C1 and C2.

TABLE

Physical composition and storage stability of effect pigment pastes 1 (Example 1) and C1 and C2 (Examples C1 and C2)

| | Example C1 | Example C2 | Example 1 |
|---|---|---|---|
| Constituent (parts by weight): | | | |
| Butyl glycol | 10 | 12 | 12 |
| Alu-Stapa Hydrolux ® 8154 | 10 | 10 | 10 |
| Mixing varnish 1 from preparation example 1 | — | — | 20 |
| Mixing varnish according to German patent application DE 102 40 972 A1, page 7, paragraph [0053] | 30 | 20 | — |

TABLE-continued

Physical composition and storage stability of effect pigment pastes 1 (Example 1) and C1 and C2 (Examples C1 and C2)

|  | Example C1 | Example C2 | Example 1 |
|---|---|---|---|
| Storage stability: | | | |
| Significant settling of pigments? | no | yes | no |
| Gassing after four weeks at 25° C.? | no | no | no |
| Gassing after four weeks at 40° C.? | yes | yes | no |
| Basecoat can be used without loss of essential properties (gloss, hiding power, pigment orientation) after storage at 40° C.? | no | no | yes |

Examples 2 and 3

The Preparation of Aqueous Effect Pigment Paste 2 and of Aqueous Basecoat Material 1

To prepare the aqueous effect pigment paste 2 of Example 2 2.8 parts by weight of the effect pigment Mearlin® EXT CFS Fine Pearl 1303V were mixed with 8.4 parts by weight of the mixing varnish from preparation example 1, and then the resulting mixture was homogenized.

To prepare the aqueous basecoat material 1 of Example 3 20 parts by weight of thickener (paste of a sodium magnesium phyllosilicate, Laponite® RD, 3 percent in water) were introduced as an initial charge. Added to this initial charge with stirring were 25.4 parts by weight of the polyurethane dispersion according to German patent application DE 40 09 858 A1, column 16, "C. Preparation of an aqueous polyurethane resin dispersion", lines 10 to 35. Added subsequently with stirring was a mixture of 4.6 parts by weight of a commercial water-dilutable melamine-formaldehyde resin (Cymel® 3020) and an aqueous polyester resin dispersion according to German patent application DE 40 09 858 A1, column 16, "D. Preparation of an aqueous polyester resin dispersion", lines 37 to 59, 6.1 parts by weight of butyl glycol and 0.4 part by weight of dimethyl-ethanolamine (10 percent strength in deionized water). The resulting mixture was admixed with 4.4 parts by weight of the polyurethane-modified polyacrylate resin according to German patent application DE 44 37 535 A1, page 7, "D. Preparation of the inventive polyurethane-modified polyacrylate", line 55, to page 8, line 23. Added to the resulting mixture with stirring were 1.0 part by weight of N-methylpyrrolidone, 1.55 parts by weight of 2-ethylhexanol, 1.55 parts by weight of Surfynol® 100 (50 percent strength in butyl glycol), 1.0 part by weight of polypropylene glycol (number-average molecular weight: 900), 0.7 part by weight of p-toluenesulfonic acid blocked with an amine, 0.68 part by weight of a modified polydimethyl siloxane, 0.25 part by weight of a 50 percent strength solution of a commercial polyurethane thickener (Nopco® DSX1550) in butyl glycol, 3.1 parts by weight of the ten-percent carbon black paste according German patent DE 100 43 405 C1, column 11, paragraph [0075], 0.5 part by weight of the silica paste according to German patent application DE 101 29 899 A1, page 12, lines 10 to 17, and 2.0 parts by weight of water. The resulting mixture was admixed with an aluminum effect pigment paste made up of 0.18 part by weight of Alu-Stapa Hydrolux® 8154, 0.4 part by weight of the aqueous polyester resin dispersion according to German patent application 40 09 858 A1 column 16, "D. Preparation of an aqueous polyester resin dispersion", lines 37 to 59, and 0.3 part by weight of butyl glycol.

The resulting mixture was admixed with the above-described mixing varnish 2 of Example 2, and the resulting aqueous basecoat material 1 was homogenized.

The aqueous basecoat material 1 was adjusted to a pH of 7.8 to 8.2 and an application viscosity of 80 mPas at 1000 s$^{-1}$ using a ten-percent strength aqueous dimethyl-ethanolamine solution and deionized water.

In order to simulate circuit line stability, 750 ml of the aqueous basecoat material 1 were introduced into a standard commercial 1 l paint can and stirred with a helical stirrer at, room temperature for 20 days. The peripheral speed was approximately 0.1 m/s. Even after 20 days there were no deposits of particles on the base of the can. The aqueous basecoat material 1 was therefore suitable for use for producing speck-free multicoat effect paint systems.

Example C3 (Comparative)

The preparation of aqueous basecoat material C3

To prepare the aqueous basecoat material C3 of Example C3 20 parts by weight of thickener (paste of a sodium magnesium phyllosilicate, Laponite® RD, 3 percent in water) were introduced as an initial charge. Added to this initial charge with stirring were 22.1 parts by weight of the polyurethane dispersion according to German patent application DE 40 09 858 A1, column 16, "C. Preparation of an aqueous polyurethane resin dispersion", lines 10 to 35 and 3.3 parts by weight of the primary dispersion of the graft copolymer (B) according to German patent application DE 199 48 004 A1, Example 2, "The preparation of the primary dispersion of an inventive graft copolymer 1", page 20, lines 10 to 21. Added subsequently with stirring was a mixture of 4.6 parts by weight of a commercial water-dilutable melamine-formaldehyde resin (Cymel® 3020) and an aqueous polyester resin dispersion according to German patent application DE 40 09 858 A1, column 16, "D. Preparation of an aqueous polyester resin dispersion", lines 37 to 59, 6.1 parts by weight of butyl glycol and 0.4 part by weight of dimethyl-ethanolamine (10 percent strength in deionized water). The resulting mixture was admixed with 4.4 parts by weight of the polyurethane-modified polyacrylate resin according to German patent application DE 44 37 535 A1, page 7, "D. Preparation of the inventive polyurethane-modified polyacrylate", line 55, to page 8, line 23. Added to the resulting mixture with stirring were 1.0 part by weight of N-methylpyrrolidone, 1.55 parts by weight of 2-ethylhexanol, 1.55 parts by weight of Surfynol® 100 (50 percent strength in butyl glycol), 1.0 part by weight of polypropylene glycol (number-average molecular weight: 900), 0.7 part by weight of p-toluenesulfonic acid blocked with an amine, 0.68 part by weight of a modified polydimethylsiloxane, 0.25 part by weight of a 50 percent strength solution of a commercial polyurethane thickener (Nopco® DSX1550) in butyl glycol, 3.1 parts by weight of the ten-percent carbon black paste according to German patent DE 100 43 405 C1, column 11, paragraph [0075], 0.5 part by weight of the silica paste according to German patent application DE 101 29 899 A1, page 12, lines 10 to 17, and 2.0 parts by weight of water. The resulting mixture was admixed with an aluminum effect pigment paste made up of 0.18 part by weight of Alu-Stapa Hydrolux® 8154, 0.4 part by weight of the aqueous polyester resin dispersion according to German patent application 40 09 858 A1 column 16, "D. Preparation of an aqueous polyester resin dispersion", lines 37 to 59, and 0.3 part by weight of butyl glycol.

The resulting mixture was admixed with an effect pigment paste made up of 2.8 parts by weight of the effect pigment Mearlin® EXT CFS Fine Pearl 1303V and 8.4 parts by weight of the mixing varnish according to German patent application DE 102 40 972 A1, page 7, paragraph [0053], and the resulting aqueous basecoat material was homogenized.

The aqueous basecoat material C 3 was adjusted to a pH of 7.8 to 8.2 and an application viscosity of 80 mPas at $1000\ s^{-1}$ using a ten percent strength aqueous dimethylethanolamine solution and deionized water.

In order to simulate circuit line stability, 750 ml of the aqueous basecoat material C 3 were introduced into a standard commercial 1 l paint can and stirred with a helical stirrer at room temperature for 20 days. The peripheral speed was approximately 0.1 m/s. After 20 days there were deposits of particles at the bottom of the can. The aqueous basecoat material C 3 was therefore not suitable for use for producing speck-free multicoat effect paint systems. Because of the visible specks in the multicoat effect paint systems in question, the corresponding painted automobile bodies required afterwork, going as far as the repainting of the automobile bodies in some cases, and in the worst cases the corresponding painted automobile bodies had to be withdrawn from production.

Examples 4 (Inventive) and C4 (Comparative)

The Production of Multicoat Effect Paint Systems 1 (Example 4) and C3 (Example C4)

The multicoat effect paint system 1 of Example 4 was produced using the aqueous basecoat, material 1 of Example 3.

The multicoat effect paint, system C3 of Example C4 was produced using the aqueous basecoat material C3 of Example C3.

Steel panels (bodywork panels) which measured 30 times 70 cm and to which a conventional, cathodically deposited and baked electrocoat had been applied, were coated with a commercial surfacer from BASF Coatings AG, after which the resulting surfacer films were flashed off at 20° C. and a relative humidity of 65% for 5 minutes and baked at 140° C. in a forced-air oven for 30 minutes. After the steel panels had cooled to 20° C. the aqueous basecoat materials 1 and C3 were applied, each in two spray passes. The first, application was made by ESTA (bell speed: 45 000 $min^{-1}$; directing air ESTA: 120 l/min (s.t.p.); voltage: 65 kV; distance: 0.25 m; paint ejection flow rate: 170 ml/min), corresponding to a dry film thickness of 8 to 10 µm. The second application was made pneumatically (distance: 0.32 m; paint ejection flow rate: 540 ml/min; atomizer air volume: 300 l/min (s.t.p.); atomizer air pressure: 4.8 bar; horn air volume: 395 l/min (s.t.p.); horn air pressure: 5.2 bar), corresponding to a dry film thickness of 4 to 6 µm. The aqueous basecoat films were flashed off for two minutes each after both the first and second applications. Subsequently they were predried at 80° C. for 10 minutes, cooled and over-coated with a commercial two-component clearcoat material from BASF Coatings AG, corresponding to a dry film thickness of 40 µm. Thereafter the aqueous basecoat films and clearcoat films were baked together at 130° C. for 30 minutes, giving the multicoat paint system 1 of Example 4 and the multicoat paint system C3 of Example C4.

The multicoat paint systems 1 and C3 were inspected under diffuse light from a distance of 2 to 3 m from almost straight on (800) and from an oblique viewpoint (400) for light/dark shading (clouds) and given a rating accordingly (rating 1: no clouds visible; to rating 5: clouds very distinctly visible).

The multicoat paint system 1 received a rating of 2 for both straight-on and oblique viewing, whereas the rating for multicoat paint system C3 was 3. This underlined the fact that as a result of the aqueous effect pigment paste 1 of Example 1 it was possible to achieve a significant improvement in pigment orientation and hence a significant reduction in light/dark shading.

The invention claimed is:

1. An aqueous effect pigment paste comprising
    (A) at least one effect pigment, wherein the pigment concentration in said aqueous effect pigment paste is 1.0 to 70 percent by weight,
    (B) an aqueous dispersion of at least one graft copolymer prepared by subjecting at least one monomer (a) in an aqueous dispersion of at least one polyurethane (B1) to free radical (co)polymerization,
    wherein the at least one polyurethane comprises at least one lateral and/or at least one terminal ethenylarylene group and the at least one polyurethane is prepared by reacting
        (1) at least one polyurethane prepolymer (B11) comprising at least one free isocyanate group with
        (2) at least one adduct (B12), prepared by reacting
            (2.1) at least one ethenylarylene mono-isocyanate (B121) with
            (2.2) at least one compound (B122), selected from the group consisting of polyols, polyamines and compounds containing at least one hydroxyl group and at least one amino group,
        wherein at least one isocyanate-reactive group is left in the adduct (B12), and
    (C) at least one surface-active compound selected from the group consisting of polyoxyalkylene derivatives of non-drying oils.

2. The aqueous effect pigment paste of claim 1, wherein the effect pigments (A) are selected from the group consisting of optical effect, color and optical effect, magnetically shielding, electrically conductive, and fluorescent pigments.

3. The aqueous effect pigment paste of claim 2, wherein the effect pigments (A) are selected from the group consisting of optical effect, and color and optical effect pigments.

4. The aqueous effect pigment paste of claim 3, wherein the optical effect, and color and optical effect pigments (A) are selected from the group consisting of metal effect pigments, effect pigments composed of metals and nonmetals, and nonmetallic effect pigments.

5. The aqueous effect pigment paste of claim 1, wherein the ethenylarylene monoisocyanate (B121) has the general formula I:

$$CH_2=C(R)\text{-}A\text{-}X-NCO \qquad (I)$$

wherein:
A is a substituted or unsubstituted $C_6$-$C_{20}$ arylene radical;
R is a hydrogen atom, a halogen atom, a nitrile group, or a substituted or unsubstituted alkyl, cycloalkyl, alkylcycloalkyl, cycloalkylalkyl, aryl, alkylaryl, cycloalkylaryl, arylalkyl or arylcycloalkyl radical; and
X is a divalent organic radical.

6. The aqueous effect pigment paste of claim 5, wherein the arylene radical A of formula (I) is 1,2-, 1,3- and/or 1,4-phenylene.

7. The aqueous effect pigment paste of claim 5, wherein R of the formula (I) is a hydrogen atom or a methyl group.

8. The aqueous effect pigment paste of claim 5, wherein the divalent organic radical X of the formula (I) is a branched or unbranched $C_3$-$C_6$ alkanediyl radical.

9. The aqueous effect pigment paste of claim 8, wherein the divalent organic radical X is —C(CH₃)₂—.

10. The aqueous effect pigment paste of claim 5, wherein the ethenylarylene monoisocyanate (B121) of the formula (I) is 1-(1-isocyanato-1-methylethyl)-3-(1-methylethenyl)benzene.

11. The aqueous effect pigment paste of claim 1, wherein the polyurethane (B1) comprises hydrophilic functional groups.

12. The aqueous effect pigment paste of claim 1, wherein the polyurethane (B1) contains an ethenylarylene group of the general formula II:

CH₂=C(R)-A-  (II)

wherein A is a substituted or unsubstituted C₆-C₂₀ arylene radical and R is a hydrogen atom, a halogen atom, a nitrile group or a substituted or unsubstituted alkyl, cycloalkyl, alkylcycloalkyl, cycloalkylalkyl, aryl, alkylaryl, cycloalkylaryl, arylalkyl or arylcycloalkyl radical.

13. The aqueous effect pigment paste of claim 12, wherein the radical R of formula (II) is a hydrogen atom or a methyl group.

14. The aqueous effect pigment paste of claim 12, wherein the arylene radical A of the formula (II) is 1,2-, 1,3- and/or 1,4-phenylene.

15. The aqueous effect pigment paste of claim 12, wherein the ethenylarylene group (II) is joined to the polyurethane main chain via a divalent or trivalent linking radical (III) comprising at least one of a urethane group, a urea group, or a mixture thereof.

16. The aqueous effect pigment paste of claim 15, wherein the linking radical (III) comprises at least one of the divalent or trivalent groups of the general formulae IIIa to IIIc:

—X—NH—C(O)—O—  (IIIa)

—X—NH—C(O)—NH—  (IIIb)

or

—X—NH—C(O)—N<  (IIIc),

wherein X is a divalent organic radical.

17. The aqueous effect pigment paste of claim 1, wherein the polyurethane prepolymer (B11) is prepared by reacting at least one compound (B122), selected from the group consisting of polyols, polyamines, and compounds containing at least one hydroxyl group and at least one amino group, with at least one polyisocyanate (B123).

18. The aqueous effect pigment paste of claim 1, wherein the compounds (B122) are oligomers or polymers.

19. The aqueous effect pigment paste of claim 18, wherein the oligomers and polymers (B122) are polyesters, polyurethanes, and mixtures thereof.

20. The aqueous effect pigment paste of claim 1, wherein the surface-active compounds (C) each comprise a polyoxyalkylene group.

21. The aqueous effect pigment paste of claim 1, wherein the surface-active compounds (C) comprise polyoxyethylene groups each of which contain from 10 to 60 oxyalkylene groups.

22. The aqueous effect pigment paste of claim 21, wherein the oxyalkalene groups of the surface-active compounds (C) comprise oxyethylene groups.

23. The aqueous effect pigment paste of claim 1, wherein the surface-active compounds (C) are derivatives of nondrying vegetable oils.

24. The aqueous effect pigment paste of claim 23, wherein the surface-active compounds (C) are derivatives of castor oil.

25. A process for preparing the aqueous effect pigment paste of claim 1, which comprises mixing at least constituents (A), (B) and (C) with one another and homogenizing the resulting mixture.

26. A method of using the aqueous effect pigment paste of claim 1, in a sealant, adhesive or coating material, wherein the sealant, adhesive, or coating material is applied to seal, adhesively bond, or coat a substrate.

27. The method of claim 26, wherein the coating materials are aqueous basecoat materials.

28. The method of claim 27, wherein the aqueous basecoat materials are for producing multicoat color and/or effect paint systems on primed or unprimed substrates.

29. The method of claim 28, wherein the multicoat color and/or effect paint systems are produced by a wet-on-wet method comprising:
  (VI) preparing a basecoat film by applying an aqueous basecoat material to a substrate,
  (VII) drying the basecoat film,
  (VIII) producing a clearcoat film by applying a clearcoat material to the basecoat film, and
  (VIV) jointly curing at least the basecoat film and the clearcoat film.

30. The method of claim 29, wherein the substrates are at least one of moldings, films or fibers, plastic, motor vehicle bodies, industrial components, mechanical components, optical components, electrical components, coils, packaging, or furniture.

31. The aqueous effect pigment paste of claim 1, wherein the at least one surface active compound (C) is present in an amount of from 0.1% to 15% by weight and wherein the pigment concentration in said aqueous effect pigment paste is 3.0 to 60 percent by weight.

* * * * *